Patented Aug. 30, 1949

2,480,221

UNITED STATES PATENT OFFICE 2,480,221

CASHEW NUT SHELL LIQUID AND KERNEL OIL SEPARATION

Solomon Caplan, New York, N. Y., assignor to The Harvel Corporation, a corporation of New Jersey No Drawing. Application September 17, 1945, Serial No. 616,958

6 Claims. (Cl. 260—412.2)

This invention relates to novel methods for separating from each other various constituents of cashew nuts. More particularly the invention is directed to novel methods for treating whole cashew nuts in order to separate from each other certain constituents thereof. In one of its more specific aspects the invention is directed to novel methods for separating cashew nut shell liquid from cashew kernel oil.

Cashew nuts consist of an outer tough fibrous shell within which is located a kernel. Between the kernel and outer shell is a honeycomb type structure filled with a liquid constituent known as cashew nut shell liquid. One of the components of said kernel is an oil known as cashew kernel oil which may be removed therefrom in any one of a number of different ways.

According to this invention the whole cashew nuts may be first masticated to provide a small particle pulpy mass. This pulpy mass may be treated in a number of different manners to separate the various constituents thereof and particularly the cashew nut oil constituent from the cashew kernel oil constituent thereof. In the practice of this invention the cashew nut shell liquid is separated from the cashew kernel oil constituent by treating a mixture of the same with a solvent capable of selectively dissolving one of said constituents and preferably the cashew nut shell liquid constituent. In the course of my experimentations with this problem I have discovered that an alcohol such as methyl alcohol, ethyl alcohol, isopropyl alcohol or any combination of these three alcohols is admirably suited for this purpose and is capable of selectively dissolving the cashew nut shell liquid when in the presence of said cashew kernel oil.

The following examples are given by way of illustrating the invention and are not to be regarded as limitations thereof, all parts being given by weight unless otherwise indicated.

Example 1

100 parts of cashew nuts are masticated or ground into a pulpy mass. This mass is then placed in a canvas bag and while in said bag is placed in a hydraulic electrically heated press. The temperature of the pulpy mass is preferably elevated above room temperature in order to increase the mobility of the liquid therein so that the yield of fluid material may be as high as possible. The temperature of the mass is preferably maintained at 150° F.–200° F. although higher or lower temperatures may be employed. While maintained at said temperature the mass is pressed. As a result of this pressing operation, a liquid exudes from said bag and is recovered. This liquid which contains some solid matter is a combination and probably a solution of cashew nut shell liquid and cashew kernel oil. The quantity of this liquid combination recovered may be between 20 to 30 parts. Then to 20 parts of said liquid combination of cashew nut shell liquid and cashew kernel oil is added between 60 to 100 parts of methyl alcohol, ethyl alcohol, or isopropyl alcohol and preferably methyl alcohol. This mixture is then agitated by means of a paddle agitator for a period of about 30 minutes in order to provide substantially uniform and intimate contact between said alcohol and said combination of cashew nut shell liquid and cashew kernel oil. Then the agitation is terminated and the mass is allowed to stand for a period of about 4 to 8 hours. After this period the mass has separated into two main layers with the upper layer being a solution of cashew nut shell liquid in said alcohol and the lower layer being a pasty mass consisting of a finely divided solid matter suspended in the cashew kernel oil. The bulk of the supernatent alcohol solution of cashew nut shell liquid may be separated by decantation. The remaining mixture of said pasty mass and a small proportion of solution of cashew nut shell liquid in alcohol is filtered. The alcohol solution of cashew nut shell liquid passes through the filter while the paste remains on the filter medium. While on said filter medium this pasty mass is washed once with said alcohol to remove any adhering or residual cashew nut shell liquid. This filtrate is collected and added to the portion of cashew nut shell liquid in alcohol which was previously decanted. Then the pasty mass, which is still on said filter medium is treated with a petroleum solvent such as textile spirits or V. M. P. naphtha which dissolves the kernel oil component of the said pasty mass. This solution passes through the filter medium leaving behind on said medium the finely divided solid matter. This solid matter is nitrogenous and is soluble in dilute sodium hydroxide. While on said filter medium it may be subjected to a dilute sodium hydroxide which dissolves most of the same and may be recovered as a filtrate and separated from any fine particles of fibrous matter which remain on the filter medium. The solution of cashew nut shell liquid in said alcohol may be distilled at a low temperature to distill off the alcohol therefrom. The kernel oil solution may also be distilled to distill off the solvent therefrom leaving behind cashew kernel oil having an index of refraction of 1.465 to 1.475 at 25° C.

As a result of the pressing operation, besides said liquid combination of cashew nut shell liquid and cashew kernel oil as well as some nitrogenous matter, a dry pressed cake may be recovered and this cake consists essentially of de-oiled nut meats and shells. If desired this cake may be readily crumbled and broken up into small particles which may be treated with a solvent such as V. M. P. naphtha, petroleum spirits, textile spirits, propyl alcohol, butyl alcohol as well as the higher alcohols, acetone or the like, in order to extract from said cake any residual cashew kernel oil and cashew nut shell liquid contained therein. The resultant mass may then be passed through a plate and frame or other type filter press whereby the solution of cashew nut shell liquid and cashew kernel oil in the solvent is separated from the solid constituent thereof. This solution may be distilled to remove the solvent therefrom and is then treated with ethyl, methyl or isopropyl alcohol in the same manner before described in order to separate the cashew nut shell liquid from the cashew kernel oil. The resulting filter cake because of its high nitrogen content finds utility in a number of different fields such as animal feeding and fertilizer.

*Example 2*

100 parts of cashew nuts are masticated or ground into a pulpy mass of small particles. To said mass is added a common solvent for the cashew nut shell liquid and cashew kernel oil constituents thereof. For this purpose there is added to this pulpy mass 100 to 1000 parts of one of said common solvents which may be textile spirits, V. M. P. naphtha or the like. Then this mixture is stirred in order to provide substantially uniform distribution and intimate contact between said solvent and said solid mass. Then the resultant mass is placed in a filter press which may be of the plate and frame type whereupon the liquid constituent thereof passes therethrough, is recovered and consists essentially of cashew nut shell liquid and cashew kernel oil dissolved in said solvent and together with a small amount of solid matter. The product remaining in the press is washed with about 100 parts of said solvent and the resultant solution which passes through said filter press is recovered and added to the original filtrate. The filter cake which consists essentially of substantially completely de-oiled nut meats and shell particles having a small proportion of solvent entrapped therein, may be heated to remove said solvent therefrom which is recovered leaving behind a substantially dry cake having the uses heretofore mentioned in Example 1. The recovered filtrate consisting essentially of the cashew nut shell liquid and cashew kernel oil in said solvent may be distilled to remove said common solvent therefrom after which the combination of cashew kernel oil and cashew nut shell liquid may be treated with ethyl, methyl or isopropyl alcohol to separate the cashew nut shell liquid from the cashew kernel oil constituent as set forth in Example 1.

*Example 3*

100 parts of cashew nuts are masticated or ground into a pulpy mass of small particles. To said mass is added a common solvent for the cashew nut shell liquid and cashew kernel oil constituents thereof. For this purpose there is added to this pulpy mass 100 to 1000 parts of one of said common solvents which may be textile spirits, V. M. P. naphtha or the like. Then this mixture is stirred in order to provide substantially uniform distribution and intimate contact between said solvent and said solid mass. Then the resultant mass is placed in a filter press which may be of the plate and frame type whereupon the liquid constituents thereof pass therethrough, is recovered and consists essentially of cashew nut shell liquid and cashew kernel oil dissolved in said solvent and together with a small amount of solid matter. The product remaining in the press is washed with about 100 parts of said solvent and the resultant solution which passes through said filter press is recovered and added to the original filtrate. The filter cake which consists essentially of substantially completely de-oiled nut meats and shell particles having a small proportion of solvent entrapped therein, may be heated to remove said solvent therefrom which is recovered leaving behind a substantially dry cake having the uses heretofore mentioned in Example 1. To each 100 parts of the recovered filtrate consisting essentially of the cashew nut shell liquid and cashew kernel oil in said solvent, there may be added at least 50 parts of methyl, ethyl or isopropyl alcohol and the mixture shaken to permit the alcohol to extract the cashew nut shell liquid portion of the naphtha solution. After separation of the alcohol layer, which will be the lower layer, the remaining naphtha solution may again be shaken with another portion of at least 50 parts of the alcohol to remove the major portion of the remaining cashew nut shell liquid which may be contained in the naphtha solution. Removal of the alcohol from the combined alcohol extracts will leave the cashew nut shell liquid in relatively uncontaminated form and similarly removal of the naphtha from the naphtha layer will leave the cashew kernel oil in relatively uncontaminated form.

Instead of selectively dissolving the cashew nut shell liquid, as heretofore set forth, I may selectively dissolve the cashew kernel oil by employing liquid propane at an appropriate temperature.

Having thus described my invention, what I claim and desire to protect by Letters Patent is:

1. The method comprising to a combination of cashew nut shell liquid and cashew kernel oil adding a quantity of methyl alcohol to selectively dissolve said cashew nut shell liquid and then separating said cashew kernel oil from said solution of cashew nut shell liquid in said methyl alcohol.

2. The method comprising to a combination of cashew nut shell liquid and cashew kernel oil adding a quantity of ethyl alcohol to selectively dissolve said cashew nut shell liquid and then separating said cashew kernel oil from said solution of cashew nut shell liquid in said ethyl alcohol.

3. The method comprising to a combination of cashew nut shell liquid and cashew kernel oil adding a quantity of isopropyl alcohol to selectively dissolve said cashew nut shell liquid and then separating said cashew kernel oil from said solution of cashew nut shell liquid in said isopropyl alcohol.

4. The method comprising simultaneously removing from cashew nuts a combination comprising cashew nut shell liquid and cashew kernel oil, adding a quantity of an alcohol selected from the group consisting of methyl alcohol, ethyl alcohol and isopropyl alcohol to selectively dissolve the cashew nut shell liquid component and separating the cashew kernel oil from said solution.

5. The method comprising simultaneously removing from cashew nuts a combination comprising cashew nut shell liquid and cashew kernel oil, adding a quantity of methyl alcohol to selectively dissolving said cashew nut shell liquid and then separating said cashew kernel oil from said solution of cashew nut shell liquid in said methyl alcohol.

6. The method comprising to a combination of cashew nut shell liquid and cashew kernel oil adding a quantity of an alcohol selected from the group consisting of methyl alcohol, ethyl alcohol and isopropyl alcohol to selectively dissolve said cashew nut shell liquid and then separating said cashew kernel oil from said solution of cashew nut shell liquid in said alcohol.

SOLOMON CAPLAN.

REFERENCES CITED

The following references are of record in the file of this patent:

UNITED STATES PATENTS

| Number | Name | Date |
| --- | --- | --- |
| 2,357,881 | Dombrow | Sept. 12, 1944 |

OTHER REFERENCES

Mattiello: Protective and Decorative Coatings, Wiley, N. Y., 1941, vol. 1, pages 77, 78.

Merck's Index, Ed. 5, Merck & Co., 1940, page 402.